UNITED STATES PATENT OFFICE.

HANS LUBBERGER, OF FRANKFORT-ON-THE-MAIN, GERMANY, ASSIGNOR TO LUDWIG WILHELM GANS, OF FRANKFORT-ON-THE-MAIN, GERMANY.

PROCESS OF CLARIFYING LIQUIDS.

SPECIFICATION forming part of Letters Patent No. 706,075, dated August 5, 1902.

Application filed January 21, 1902. Serial No. 90,702. (No specimens.)

*To all whom it may concern:*

Be it known that I, HANS LUBBERGER, a citizen of Germany, residing at Frankfort-on-the-Main, in the Empire of Germany, have invented a certain new and useful Improved Process of Clarifying Liquids by Means of Gelatin and an Oxidizing Agent, of which the following is a specification.

It is known that glue, gelatin, and similar or equivalent substances are frequently used as clarifiers for turbid liquids, gelatin being frequently employed for fining wine. The effect of the clarifier is due to its capability of entering into combination with tannic acid to form a compound which separates in an insoluble state, carrying down with it the impurities suspended in the liquid. If, therefore, solutions are to be clarified which do not already contain tannic acid—such as wine, for instance—a little tannin is frequently mixed with the liquid before the solution of gelatin or glue is added. Cases, however, occur in practice where an admixture of tannic acid is not desirable, either because a combination of this acid with some ingredient of the solution is feared or because it is necessary to avoid the black discoloration due to traces of iron in solutions containing tannic acid. Some solutions also cannot be properly clarified by the addition of tannic acid and gelatin. I have now succeeded in inventing another method of separating the gelatin in an insoluble state. It consists in adding to the solution small quantities of an oxidizing agent—*e. g.*, chlorid of lime, hydrogen peroxid, ($H_2O_2$,) potassium permanganate, or the like. By this means the gelatin or glue is apparently oxidized, an insoluble product of oxidation being formed, which separates, especially if heated from 50° to 60° centigrade, in the shape of a compact coagulated cake that includes all the suspended particles, so that the solution is left absolutely clear. It is of course assumed that the substances contained in the solution to be so treated will not be injured by the oxidizing agent employed. The quantity of such agent to be used varies somewhat, inasmuch as the impure solutions to be treated will frequently contain impurities more or less attacked by the agent employed. The quantity of oxygen required for the glue or gelatin, however, is very trifling. It will be necessary in each case to ascertain the quantity to be employed and to add as much as will lead to a perfect precipitation of the gelatin or glue. Any small surplus of oxidizing substance that may have been added can be removed in any convenient manner—for instance, by a suitable reducing agent, such as sulfurous acid.

The following description of clarifying a solution of raw gum-arabic or other gum may serve as an example.

Example: One thousand kilos of dirty solution of gum-arabic of about twenty per cent. are mixed with two to four kilos potassium permanganate, according to its degree of purity. The liberated alkali is neutralized by acid. Two kilos of gelatin dissolved in five to ten times its bulk of water are then added, and the solution is heated to 50° to 60°. During the heating ten to twenty-five kilos more of a five-per-cent. solution of potassium permanganate is added and mixed well by stirring, the newly-generated alkali being again neutralized by the addition of acid. Dark flakes of peroxid of manganese ($MnO_2$) mixed with gelatin or oxidized gelatin are very soon precipitated and quickly coagulate to a firm cake, which includes all the suspended particles. The solution itself is clear and can easily be freed in a suitable manner from the small quantity of dissolved hydrated peroxid of manganese and from any manganese that may be contained in the form of manganous salts. It is then clear as water.

With this process the potassium permanganate serves first as a bleaching agent by oxidizing the impurities of the solution, for which purpose by far the greatest part of it is employed. Furthermore, it leads to the oxidation of the gelatin, which as it is precipitated includes the peroxid of manganese generated as well as all mechanical turbid admixtures.

By the term "gelatin" employed in the claims I intend to include glue and other similar or equivalent substances.

Having thus described my invention, what I claim as new, and desire to patent, is—

1. The process of clarifying solutions by adding thereto a solution of gelatin and an oxidizing agent by which the gelatin is coagulated.

2. The process of clarifying solutions by adding thereto a solution of gelatin and an oxidizing agent by which the gelatin is coagulated while the solution is subjected to heat.

Signed at Frankfort-on-the-Main, in the Empire of Germany, this 7th day of January, A. D. 1902.

HANS LUBBERGER.

Witnesses:
 JEAN GRUND,
 CARL GRUND.